(12) United States Patent
Matsuda et al.

(10) Patent No.: US 6,294,987 B1
(45) Date of Patent: Sep. 25, 2001

(54) VEHICLE SAFETY RUNNING CONTROL SYSTEM

(75) Inventors: Shohei Matsuda; Satoshi Hada; Yoichi Sugimoto; Yoshihiro Urai; Shoji Ichikawa, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/306,514

(22) Filed: May 6, 1999

(30) Foreign Application Priority Data

May 7, 1998 (JP) .................................. 10-140594

(51) Int. Cl.$^7$ ...................................... B60Q 1/00
(52) U.S. Cl. ................. 340/436; 340/467; 340/903; 340/435; 180/167; 180/169; 180/282; 701/301
(58) Field of Search ...................... 340/436, 435, 340/438, 467, 901, 903, 943, 936; 180/167, 169, 282; 701/301

(56) References Cited

U.S. PATENT DOCUMENTS

| | | | |
|---|---|---|---|
| 5,249,157 | * | 9/1993 | Taylor .................................. 340/903 |
| 5,521,579 | * | 5/1996 | Bernhard ............................. 340/438 |
| 5,530,651 | * | 6/1996 | Uemura et al. ...................... 364/461 |
| 5,558,370 | * | 9/1996 | Behr ..................................... 280/806 |
| 5,680,118 | * | 10/1997 | Cusumano et al. ................. 340/903 |
| 5,684,473 | * | 11/1997 | Hibino et al. ....................... 340/903 |
| 5,978,737 | * | 11/1999 | Pawlowski et al. ................. 701/301 |

FOREIGN PATENT DOCUMENTS

| | | |
|---|---|---|
| 5-181529 | 7/1993 | (JP) . |
| 6-298022 | 10/1994 | (JP) . |

* cited by examiner

*Primary Examiner*—Edward Lefkowitz
*Assistant Examiner*—Davetta W. Goins
(74) *Attorney, Agent, or Firm*—Arent Fox Kintner Plotkin & Kahn, PLLC

(57) ABSTRACT

A system for controlling running safety of a vehicle having an alarm and an automatic braking system. A plurality of decelerations $\alpha 2n$ of an obstacle such as another vehicle present ahead on the road is predicted and corresponding manipulated variables $\alpha 1n$ (braking amount) to be supplied to the vehicle which indicate possible deceleration of the vehicle are determined. Then threshold values $L\alpha 2n$ for alarming and automatic braking are determined corresponding to the predicted deceleration and are successively compared with the distance to the obstacle. When the distance falls below any of the threshold values, alarming or automatic braking is effected to avoid contact with the obstacle, thereby making the system relatively simple and enabling operation to match the driver's expectations.

6 Claims, 4 Drawing Sheets

VEHICLE SAFETY RUNNING CONTROL SYSTEM

BACKGROUND OF THE INVENTION

1. Field of the Invention

This invention relates to a vehicle safety running control system, more particularly to a vehicle safety running control system which predicts or anticipates the possible decelerations of an obstacle present ahead of the vehicle to conduct contact avoidance control using the predicted decelerations.

2. Description of the Related Art

Various obstacle avoidance techniques have hitherto been proposed. For example, Japanese Laid-open Patent Application Hei 6(1994)-298022 teaches detecting the distance (relative distance) to an obstacle (e.g., another vehicle running ahead on the road) from the vehicle and automatically operating (i.e., independently of the vehicle operator's brake pedal manipulation) the braking system (and an alarm) so as to avoid contact with the obstacle.

In this prior art technique, the actual acceleration of the other vehicle (obstacle) is detected and, based on the detected acceleration, a first threshold value (relative distance) for avoiding the other vehicle by braking is determined. At the same time, a second threshold value (relative distance) for avoiding the obstacle by steering is determined based on the assumption that the subject vehicle moves to avoid the other vehicle with a lateral acceleration b0 after time τ, measured from a certain point.

The system operates the braking system automatically only when the detected relative distance falls below the first and the second threshold values. Since the braking system is not operated at unexpected times which are not anticipated by the vehicle operator, the operator does not experience annoyance caused by operation of the automatic braking when he is intending to steer to avoid an obstacle, thereby improving the driving comfort and preventing annoyance of the vehicle operator.

In the prior art system, however, although the first threshold value is determined based on the acceleration in order that the braking system is not operated at times which are not expected or anticipated by the vehicle operator, the acceleration is that actually produced by the vehicle and is not a predicted or anticipated value.

The other vehicle running ahead on the road will behave in many ways, i.e., might accelerate to move away, might keep running at a constant speed, might decelerate suddenly to stop. The possible behavior of the other vehicle will thus have great or unlimited variance. If the obstacle avoidance control should be configured to cope with every possible behavior, the control will be extremely complicated. On the other hand, if the control should be configured in a standard or uniform fashion, its operation may sometimes not match with the driver's expectations.

Japanese Laid-open Patent Application Hei 5(1993)-181529 proposes predicting deceleration (predetermined deceleration) to use in the obstacle avoidance control. The deceleration predicted in the prior art is a single value and is only used to assist in the determination of whether obstacle avoidance operation should be effected. The prior art is thus not intended to cope with different decelerations possibly generated by the other vehicle.

SUMMARY OF THE INVENTION

An object of the invention is therefore to overcome the foregoing problems and to provide a vehicle safety running control system which predicts or anticipates possible decelerations in plural values generated by an obstacle such as another vehicle running ahead of the subject vehicle and, based on the predicted decelerations, conducts the obstacle avoidance control, thereby making the control relatively simple, while enabling the control to be well matched to the drever's expectations.

To achieve these objects, the invention provides a system for controlling safety running of a vehicle, comprising: obstacle detecting means for detecting an obstacle present ahead on a course of travel of the vehicle; parameter detecting means for detecting parameters indicative of motion of the vehicle including at least speed of the vehicle; relative condition detecting means for detecting condition of the obstacle, detected by the obstacle detecting means, relative to the vehicle; deceleration predicting means for predicting a plurality of decelerations which the obstacle could generate, based on the parameters detected by the parameter detecting means and the relative condition detected by the relative condition detecting means; operation determining means for determining whether at least one of alarming and contact avoidance with the obstacle should be operated based on at least the predicted decelerations; and effecting means for effecting the operation determined by the operation determination means.

BRIEF EXPLANATION OF THE DRAWINGS

This and other objects and advantages of the invention will be made more apparent with the following description and drawings, in which.

DETAILED DESCRIPTION OF THE PREFERRED EMBODIMENTS

Embodiments of the invention will now be explained with reference to the attached drawings.

Figure 1:
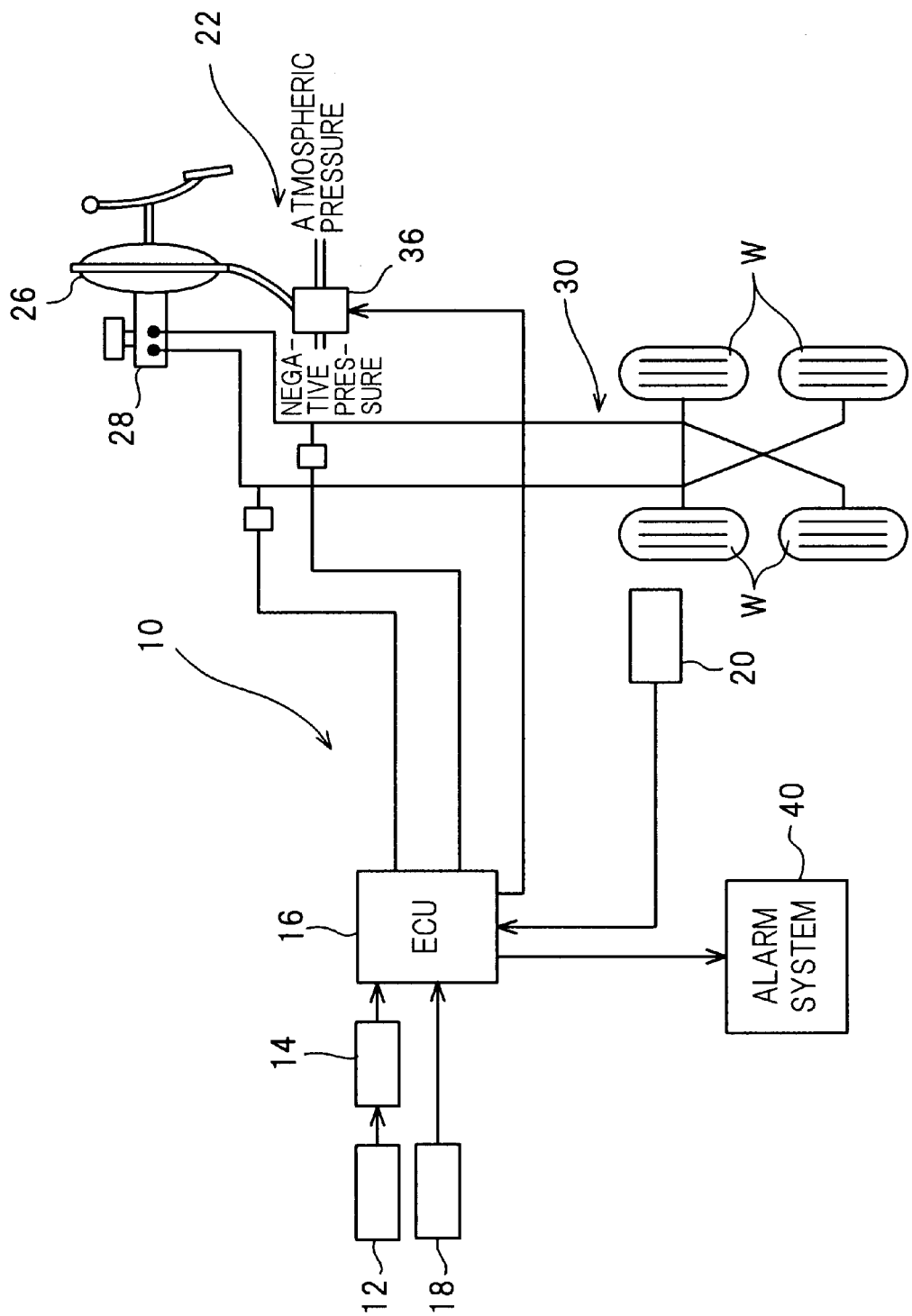
FIG. 1 is an overall schematic view showing the configuration of a vehicle safety running control system according to the invention.

FIG. 1 is an overall schematic view showing the configuration of a vehicle safety running control system according to the invention.

In the figures, reference numeral 10 designates a vehicle (partially illustrated by wheels W, etc.) having a steering mechanism (not shown) manipulated by the vehicle operator. A scanning-type laser radar (or lidar) 12 which is mounted in the proximity of the headlight (not shown) emits a laser beam (a narrow beam of coherent, powerful and nearly nonchromatic electromagnetic radiation energy) horizontally along the course of vehicle travel and receives an energy reflected from an obstacle or object (such as another vehicle present ahead of the subject vehicle 10).

The laser radar 12 is connected to a radar output processing unit 14 which is comprised of a microcomputer. The radar output processing unit 14 detects the distance (relative distance) to an obstacle or object from the vehicle 10 by measuring the time interval between transmission of the energy and reception of the reflected energy, which establishes the range of the obstacle in the beam's path. Moreover, the laser radar output processing unit 14 detects the (relative) speed of the obstacle by differentiating the measured distance, and detects the direction or orientation of the obstacle from the reflected energy to obtain two-dimensional information describing the obstacle. The output of the laser radar 12 is forwarded to an ECU (Electronic Control Unit) 16 which is also comprised of a microcomputer.

A yaw rate sensor 18 is provided at the center of the vehicle 10 to generate a signal indicative of the yaw rate (yaw angular velocity acting at the center of gravity of the vehicle 10 about the gravitational or vertical direction). The output of the yaw rate sensor 18 is sent to the ECU 16. The ECU 16 detects the yaw angle based on the output of the yaw rate sensor 20. A vehicle speed sensor 20 is provided in the proximity of a drive shaft (not shown) to generate a signal indicative of the vehicle (traveling or road) speed of the vehicle 10. The output of the vehicle speed sensor 20 is also sent to the ECU 16.

Reference numeral 22 indicates a braking system of the vehicle 10. In the braking system 22, a foot brake (brake pedal) 24 is connected, via a negative-pressure booster 26, to a master cylinder 28. The negative-pressure booster 26 has a diaphragm (not shown) which partitions the inside of the booster into two chambers such that the ratio of the negative pressure introduced from the engine intake system (not shown) relative to the atmospheric pressure introduced from outside of the engine is regulated to determine the position of the diaphragm which determines the force to boost the vehicle operator's brake pedal depression.

The master cylinder 28 supplies, via oil paths 30, hydraulic pressure (brake fluid pressure), at a pressure in response to the boosted braking force, to the brake (not shown) provided at the respective wheels W to slow or stop the rotation thereof. Thus, the vehicle is slowed and stopped at a rate of deceleration determined by the braking force.

An electromagnetic solenoid valve 36 is provided at an appropriate location of the introduction system of the negative pressure and atmospheric pressure (not fully shown). The electromagnetic solenoid valve 36 is connected, via a driver circuit (not shown), to the ECU 16 to receive a command signal (a duty-ratio signal in Pulse Width Modulation) generated by the ECU 16. The electromagnetic solenoid valve 36 opens/closes in response to the command signal to regulate the ratio of the negative pressure relative to the atmospheric pressure and operates the braking system 22 to automatically brake (i.e., to decelerate independently of the vehicle operator's brake pedal depression) the vehicle.

An alarm system (e.g., a visible indicator or audio system) 40 is provided in the proximity of the vehicle operator's seat (not shown) and is connected to the ECU 16 to receive a command signal, and alerts the vehicle operator in response to the command signal generated by the ECU 44.

The operation of the vehicle safety running control system according to the invention will next be explained.

Figure 2:
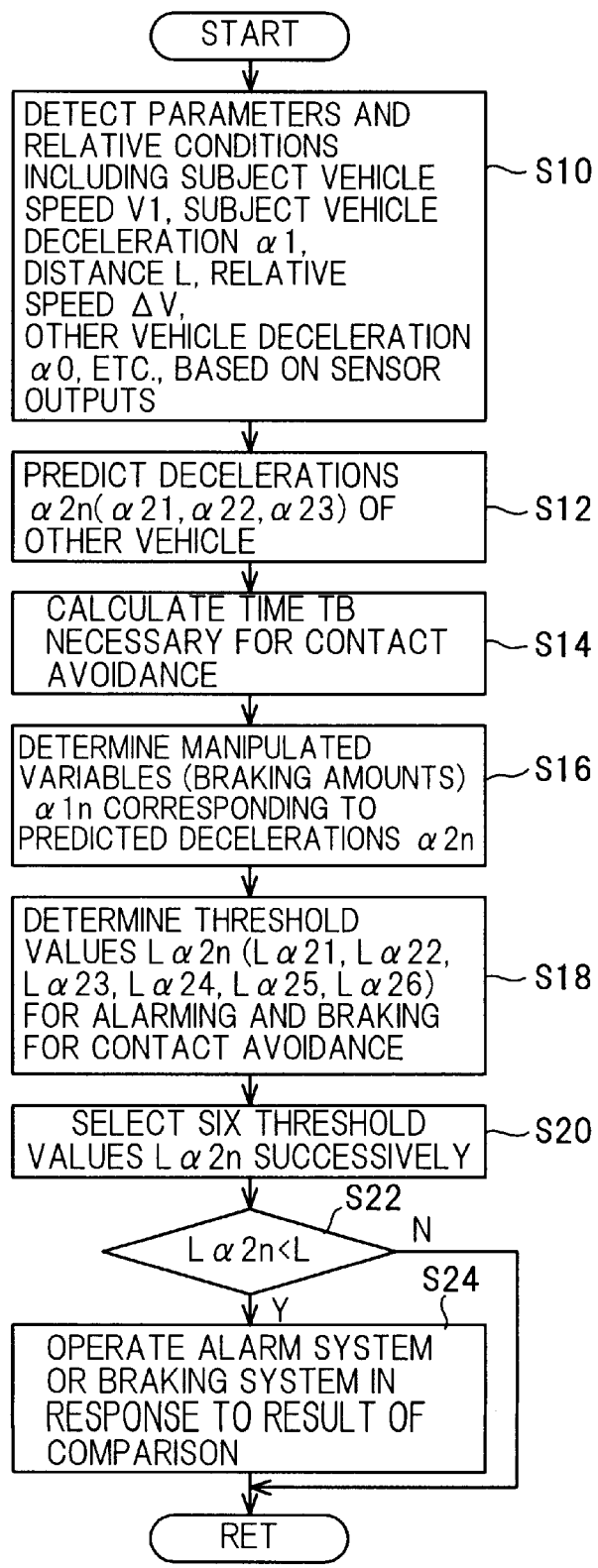
FIG. 2 is a flow chart showing the operation of the system illustrated in FIG. 1.

FIG. 2 is a flow chart showing the operation of the system. The program shown there is executed, for example, once every 100 milliseconds.

Figure 3:
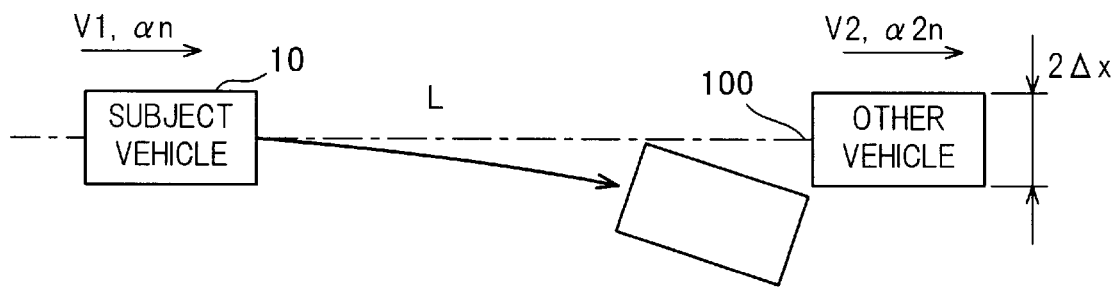
FIG. 3 is an explanatory view showing the calculation of a time necessary for the subject vehicle to avoid contact with an obstacle such as another vehicle.

The program begins in S10 in which the outputs of the sensors are read and, based on the read data, the parameters indicative of motion of the subject vehicle 10 and the conditions of other vehicle (or obstacle; illustrated and assigned with reference numeral 100 in FIG. 3) running ahead on the road relative to the subject vehicle 10, are detected or calculated.

The parameters include the speed V1 of the subject vehicle 10, the distance L from the subject vehicle 10 to the other vehicle 100, the speed V2 of the other vehicle 100, the relative speed $\Delta V$ (the difference between the subject vehicle speed V1 and the other vehicle speed V2), the deceleration $\alpha 1$ of the subject vehicle 10 and the deceleration $\alpha 0$ of the other vehicle 100, etc.

In the above, the speed V1 of the subject vehicle 10 is determined or detected based on the output of the vehicle speed sensor 20. The deceleration $\alpha 1$ of the subject vehicle 10 is also determined by obtaining the differential (or first difference) of the detected vehicle speed V1. Here, the subject vehicle deceleration $\alpha 1$ and the other vehicle deceleration $\alpha 0$ are used in this specification to mean both the deceleration (negative acceleration) and the acceleration.

Figure 4:
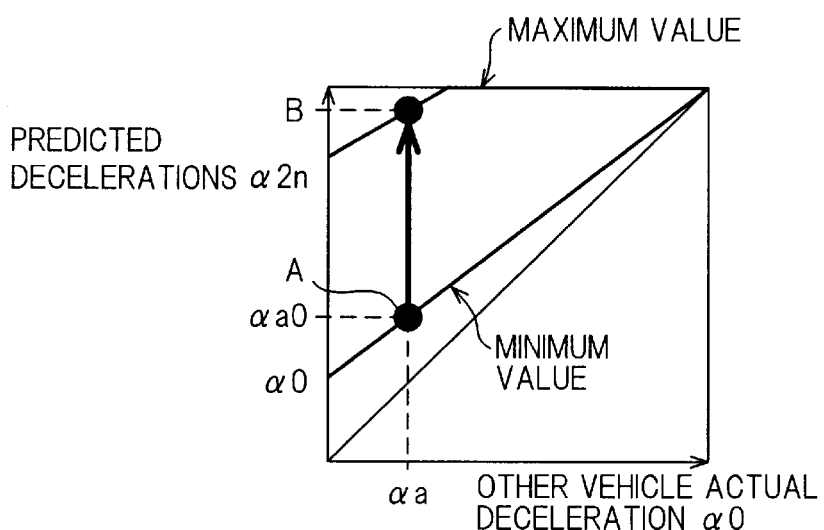
FIG. 4 is an explanatory graph showing decelerations possibly generated by the obstacle, such as another vehicle, predicted based on the actual deceleration thereof using the characteristics illustrated there.

The program then proceeds to S12 in which decelerations $\alpha 2n$ (in plural values) possibly generated in future by the other vehicle 100 are predicted. The decelerations $\alpha 2n$ should be predicted to be not less than the actual deceleration $\alpha 0$ of the other vehicle 100. FIG. 4 is an explanatory graph showing predicted decelerations possibly generated by the obstacle (other vehicle) obtained based on the actual deceleration thereof using the characteristics illustrated there.

Explaining the prediction with reference to FIG. 4, when the other vehicle actual deceleration $\alpha 0$ is, for example, $\alpha a$, the decelerations $\alpha 2n$ are predicted to be not less than $\alpha a0$ (corresponding to $\alpha a$). More specifically, the decelerations $\alpha 2n$ should be predicted as plural values (discrete or continuous) within the range from A (minimum value) to B (maximum value). The minimum value A and the maximum value B are predetermined appropriately. In this embodiment, three discrete values $\alpha 21$, $\alpha 22$, $\alpha 23$ are predicted (i.e., n=3). It should be noted here that when the subject vehicle 10 runs under no constant acceleration, in addition to the other vehicle actual declaration $\alpha 0$, other parameters including at least the subject vehicle speed V1 are needed in predicting the decelerations $\alpha 2n$.

The program next proceeds to S14 in which a time TB necessary for contact avoidance is calculated or determined. As illustrated in FIG. 3, the time TB means a time or period necessary for the subject vehicle 10 to avoid contact with the other vehicle 100.

To be more specific, assuming the subject vehicle 10 runs at the vehicle speed V1 and the deceleration $\alpha 1$, the time TB is calculated as a time or period necessary for avoiding contact with the other vehicle which runs at the vehicle speed V2 at the predicted decelerations $\alpha 2n$, based on another time necessary for steering the subject vehicle 10 laterally by a distance or length $2\Delta x$.

The value $2\Delta x$ is a value corresponding to the width of the other vehicle 100. The other vehicle width is detected from the output of the laser radar 12. Alternatively, since the vehicle width is normally in a range from 1.6 meters to 1.8 meters, such a normal vehicle width may instead be used.

The program then proceeds to S16 in which manipulated variables $\alpha 1n$ (in plural values) to be supplied to the subject vehicle 10 for contact avoidance are determined corresponding to the predicted decelerations $\alpha 2n$. It should be noted that the manipulated variables $\alpha 1n$ are not the same as the aforesaid actual deceleration $\alpha 1$ of the subject vehicle 10. The determination will later be explained in detail.

The program then proceeds to S18 in which threshold values $L\alpha 2n$ (in plural values) are determined or calculated for each of the predicted decelerations $\alpha 2n$. In other words, the threshold values in the same number as that of the predicted decelerations are calculated.

Specifically, the threshold values $L\alpha 2n$ comprise six values, i.e.:

$L\alpha 21$ for alarming determination and $L\alpha 22$ for contact avoidance determination corresponding to the predicted deceleration $\alpha 21$;

$L\alpha 23$ for alarming determination and $L\alpha 24$ for contact avoidance determination corresponding to the predicted deceleration $\alpha 22$; and $L\alpha 25$ for alarming determination and $L\alpha 26$ for contact avoidance determination corresponding to the predicted decelerations $\alpha 23$.

The threshold values ($L\alpha 2n$) are calculated using the following equation.

$$L\alpha 2n = \Delta V \times TB - (\tfrac{1}{2}) \times (\alpha 1n - \alpha 2n) TB^2 [m]$$

Here, $\alpha 1n$ are the aforesaid manipulated variables to be supplied to the subject vehicle 10 determined corresponding to the predicted decelerations $\alpha 2n$ of the other vehicle 100. This is because $\alpha 1n$ are values indicative of the manipulated variables to be supplied to the subject vehicle 10; this means that $\alpha 1n$ indicates the possible decelerations of the subject vehicle 10 when the automatic braking is effected, and are thus corresponding to the predicted decelerations of the other vehicle. Thus, the relationship between the manipulated variables $\alpha 1n$ and the predicted decelerations $\alpha 2n$ can be defined to be complementary to each other as illustrated in FIG. 5.

To summarize the calculation of the threshold values $L\alpha 2n$, the threshold value $L\alpha 2n$ are determined based on the time TB necessary for contact avoidance, while using the vehicle speeds and decelerations of the subject vehicle 10 and the other vehicle 100.

Figure 5:
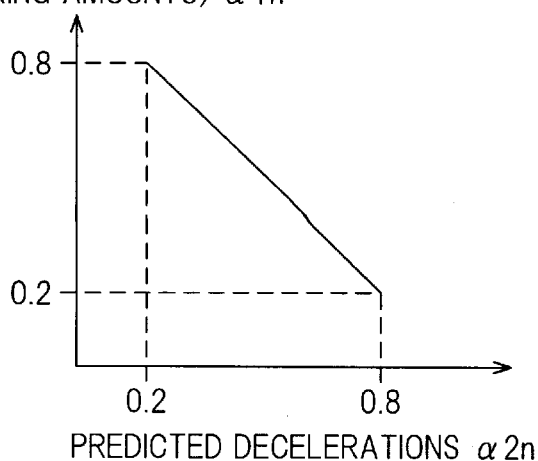
FIG. 5 is an explanatory graph showing the characteristics of manipulated variables (braking amounts) to be supplied to the subject vehicle relative to the predicted decelerations.

When defining the relationship between the manipulated variables $\alpha 1n$ and the predicted decelerations $\alpha 2n$, as in FIG. 5 and as mentioned above, the predicted decelerations can be expressed as:

$$\alpha 1n = 1 - \alpha 2n$$

Therefore, the equation can be written as:

$$L\alpha 2n = \Delta V \times TB + \{\alpha 2n - (\tfrac{1}{2})\} \times TB^2 [m]$$

Thus, the manipulated variables for contact avoidance $\alpha 1n$ and the predicted decelerations $\alpha 2n$ are defined in the complementary relationship as shown in FIG. 5 such that $\alpha 1n$ decreases with increasing $\alpha 2n$. Specifically, the manipulated variables $\alpha 1n$ are expressed in terms of the braking amount expressed as a function of the acceleration of gravity G.

The manipulated variables $\alpha 1n$ of the subject vehicle 10 are determined relative to the predicted decelerations $\alpha 2n$ of the other vehicle 100 as follows:

| predicted decelerations $\alpha 2n$ | braking amounts (manipulated variables) $\alpha 1n$ |
|---|---|
| full braking at 0.8 G | braking at 0.2 G from a long distance |
| less-than-full braking at 0.5 G | braking at 0.5 G from a medium distance |
| ordinary braking at 0.2 G | braking at 0.8 G from a short distance |

Explaining the relationship between the aforesaid threshold values and the braking amounts (manipulated variables), $L\alpha 21$, $L\alpha 22$ are the threshold values for the braking amount 0.2 G; $L\alpha 23$, $L\alpha 24$ are those for the braking amount 0.5 G; and $L\alpha 25$, $L\alpha 26$ are those for the braking amount 0.8 G.

More specifically, they are determined such that, when the distance L falls below the threshold value $L\alpha 22$, the subject vehicle 10 is braked at 0.2 G; when the distance L falls below the threshold value $L\alpha 24$, the subject vehicle is braked at 0.5 G; and when the distance L falls below the threshold value $L\alpha 26$, the subject vehicle is braked at 0.8 G The relative magnitudes of the threshold values for alarming determination are as follows:

$$L\alpha 21 > L\alpha 23 > L\alpha 25$$

Similarly, the relative magnitudes of the threshold values for contact avoidance determination are as follows:

$$L\alpha 22 > L\alpha 24 > L\alpha 26$$

Thus, they are determined such that the manipulated variables $\alpha 1n$ are complementary to the predicted decelerations $\alpha 2n$ such that $\alpha 1n$ decreases as $\alpha 2n$ increases. The threshold values $L\alpha 2n$ respectively corresponding to the manipulated variables $\alpha 1n$ are determined.

Summarizing the control in this embodiment, the control is configured such that the manipulated variables (braking amounts) for the other vehicle's fully braking is set to be a small value and hence, the threshold values $L\alpha 2n$ corresponding thereto are determined. In other words, this control is basically configured to be able to cope with the situation even if the other vehicle 100 fully brakes at an unexpected time. Accordingly, the threshold value $L\alpha 22$ for the other vehicle's fully braking is set to be maximum so as to make the braking amount to be supplied to the subject vehicle 10 least, thereby ensuring to avoid contact with the other vehicle 100 without fail, no matter how the other vehicle 100 behaves, while ensuring to match to the driver's feeling.

Moreover, there may be a situation where another vehicle suddenly squeezes from a next lane between the subject vehicle 10 and the other vehicle 100. In such instant, the distance L might already fall below threshold value $L\alpha 22$ when another vehicle appears. If this is the case, the less-than-maximum value $L\alpha 24$ is then compared with the distance L. If L is also less than $L\alpha 24$, the least value $L\alpha 26$ is compared and the contact avoidance is effected in response to the result of the comparison.

Similarly, when the distance L becomes less than any of the threshold values for alarming $L\alpha 22$, $L\alpha 24$ and $L\alpha 26$, the alarm system 40 is operated. The alarming should be varied with the respective threshold values. For example, if the alarm system 40 uses a visible indicator, the display colors or areas may, for example, be increased as the magnitude of the threshold values decreases. If the alarm 40 uses an audio system, it is arranged such that, for example, the interval of the intermittent sound decreases or the sound volume increases with decreasing magnitude of the threshold values. The effect of alerting the driver should thus be increased as the degree of approach to the other vehicle 100 increases.

Returning to the explanation of FIG. 2, the program then proceeds to S20 in which the six threshold values Lα2n are successively selected, to S22 in which the selected threshold value is compared with the distance L to determine whether the value is less than the distance, i.e., to determine whether alarming or contact avoidance should be operated.

When the result in S22 is affirmative, the program proceeds to S24 in which either of the alarm system 40 or the braking system 22 is operated in response to the result of comparison. When the result in S22 is negative, the program skips S24.

Figure 6:
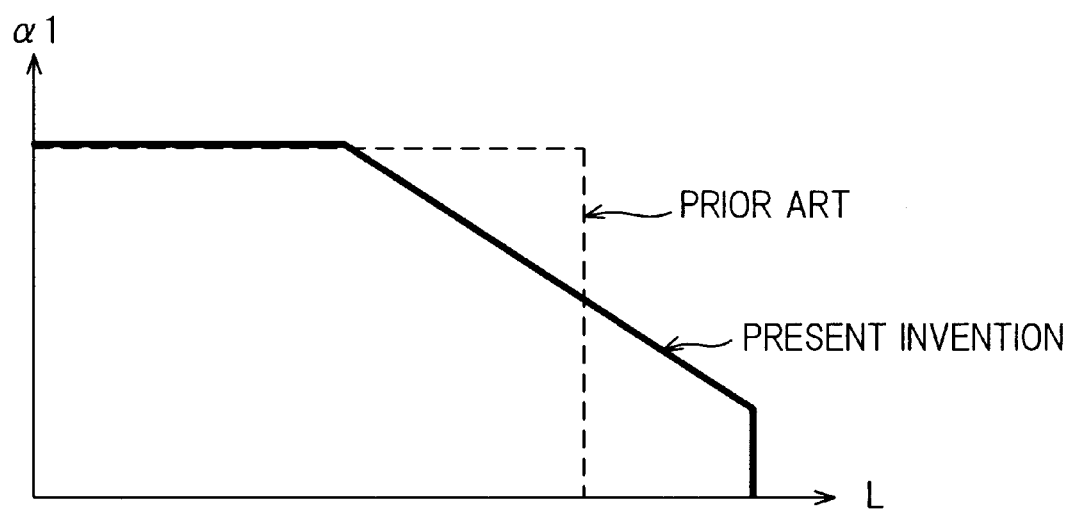
FIG. 6 is an explanatory graph showing the characteristic feature of the present invention in contrast with the prior art.

Explaining this control with reference to FIG. 6, a plurality of decelerations are predicted, which is in contrast with the prior art in which only a single deceleration is predicted. This makes it possible to predict the behavior of the other vehicle properly, thereby rendering the system relatively simple, while ensuring to match operation to the drever's expectations. Moreover, no matter how the other vehicle (obstacle) behaves, the system enables to avoid the contact therewith effectively.

As mentioned above, the embodiment is configured to have a system for controlling safety running of a vehicle (10), including: obstacle detecting means (laser radar 12, laser radar output processing unit 14, ECU 16) for detecting an obstacle (100) present ahead on a course of travel of the vehicle (10); parameter detecting means (ECU 16, S10) for detecting parameters (V1, α1, L, ΔV) indicative of motion of the vehicle including at least speed (V) of the vehicle; relative condition detecting means (ECU 16, S10) for detecting condition of the obstacle (α0), detected by the obstacle detecting means, relative to the vehicle; operation determining means (ECU 16, S22) for determining whether at least one of alarming and contact avoidance with the obstacle should be operated; and effecting means (ECU 16, S24) for effecting the operation determined by the operation determination means. The system is characterized in that: deceleration predicting means (ECU 16, S12) is provided for predicting a plurality of decelerations (α2n) which the obstacle could generate, based on the parameters (more precisely, the detected vehicle speed when the subject vehicle runs not at a constant acceleration) detected by the parameter detecting means and the relative condition (α0) detected by the relative condition detecting means; the operation determining means (ECU 16, S14–S22) determines whether at least one of alarming and contact avoidance with the obstacle should be operated based on at least the predicted decelerations; and the effecting means (ECU 16, S24) effects the operation determined by the operation determination means.

In the system, the operation determination means includes: manipulated variable determining means (ECU 16, S16) for determining a plurality of manipulated variables (α1n) for at least one of the alarming and contact avoidance operation, corresponding to the predicted decelerations (α2n); threshold value determining means (ECU 16, S18) for determining a plurality of threshold values (Lα2n) for at least one of the alarming and contact avoidance with the obstacle, corresponding to the determined manipulated variables (α1n); and comparing means (ECU 16, S22) for comparing the threshold values with the detected condition (L) of the obstacle (100) relative to the vehicle (10) detected by the relative condition detecting means; and wherein the operation determination means (ECU 16, S22) determines whether at least one of alarming and contact avoidance with the obstacle should be effected based on result of comparison by the comparing means.

In the system, the deceleration predicting means predicts the decelerations (α2n) based on actual deceleration (α0) of the obstacle such that the decelerations are not less than the actual deceleration of the obstacle.

In the system, the threshold value determining means includes: time determining means (ECU 16, S14) for determining a time (TB) necessary for the vehicle to avoid the obstacle; and determines the threshold values based on at least the determined time.

In the system, the manipulated variable determining means determines the manipulated variables (α1n) such that the manipulated variables decrease with increasing predicted decelerations.

In the system, the effecting means effects the alarming such that the alarming is varied in response to the determination of the operation determination means, when the operation determining means determines to effect the alarming.

It should be noted in the above that, as mentioned above with reference to FIG. 4, the predicted decelerations may be determined continuously within the range.

It should also be noted that, although the threshold values are determined using the time TB, they may be determined in a different manner. Although the predicted decelerations are used in the calculation of the time TB, the actual deceleration may instead be used.

It should further be noted that, although the system is configured to avoid contact by braking, it may instead be configured to carry out the same purpose by steering.

It should further be noted that, although the laser radar 12 is used as a means for detecting the other vehicle (obstacle), a millimeter-wave radar 14 or a visionary sensor such as a CCD camera may instead be used.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling safety running of a vehicle, comprising:

obstacle detecting means for detecting an obstacle present ahead on a course of travel of the vehicle;

parameter detecting means for detecting parameters indicative of motion of the vehicle including at least speed of the vehicle;

relative condition detecting means for detecting condition of the obstacle, detected by the obstacle detecting means, relative to the vehicle;

deceleration predicting means for predicting a plurality of decelerations which the obstacle could generate, based on the parameters detected by the parameter detecting means and the relative condition detected by the relative condition detecting means;

operation determining means for determining whether at least one of alarming and contact avoidance with the obstacle should be operated based on at least the plurality of the predicted decelerations; and effecting means for effecting the operation determined by the operation determination means.

2. A system according to claim 1, wherein the operation determination means includes:

manipulated variable determining means for determining a plurality of manipulated variables for at least one of the alarming and contact avoidance operation, corresponding to the predicted decelerations;

threshold value determining means for determining a plurality of threshold values for at least one of the alarming and contact avoidance with the obstacle, corresponding to the determined manipulated variables; and comparing means for comparing the threshold values with the detected condition of the obstacle relative to the vehicle detected by the relative condition detecting means;

and wherein the operation determination means determines whether at least one of alarming and contact avoidance with the obstacle should be effected based on result of comparison of the comparing means.

3. A system according to claim 1, wherein the deceleration predicting means predicts the decelerations based on actual deceleration of the obstacle such that the decelerations are not less than the actual deceleration of the obstacle.

4. A system according to claim 2, wherein the threshold value determining means includes:

time determining means for determining a time necessary for the vehicle to avoid the obstacle;

and determines the threshold values based on at least the determined time.

5. A system according to claim 2, wherein the manipulated variable determining means determines the manipulated variables such that the manipulated variables decrease with increasing predicted decelerations.

6. A system according to claim 1, wherein the effecting means effects the alarming such that the alarming is varied in response to the determination of the operation determination means, when the operation determining means determines to effect the alarming.

* * * * *